United States Patent
Rodrigues De Freitas et al.

(10) Patent No.: US 7,618,601 B2
(45) Date of Patent: Nov. 17, 2009

(54) PROCESS FOR ENRICHMENT OF ANATASE MECHANICAL CONCENTRATES IN ORDER TO OBTAIN SYNTHETIC RUTILE WITH LOW CONTENTS OF RARE EARTH AND RADIOACTIVE ELEMENTS

(75) Inventors: Lino Rodrigues De Freitas, Lagoa Santa (BR); Ronaldo Moreira De Horta, Belo Horizonte (BR); Joao Alberto Lessa Tude, Salvador (BR)

(73) Assignee: Companhia Vale Do Rio Doce, Minas Gerais (BR)

( * ) Notice: Subject to any disclaimer, the term of this patent is extended or adjusted under 35 U.S.C. 154(b) by 2 days.

(21) Appl. No.: 12/090,514

(22) PCT Filed: Sep. 20, 2006

(86) PCT No.: PCT/BR2006/000190

§ 371 (c)(1),
(2), (4) Date: Apr. 17, 2008

(87) PCT Pub. No.: WO2007/048210

PCT Pub. Date: May 3, 2007

(65) Prior Publication Data

US 2008/0286181 A1 Nov. 20, 2008

(30) Foreign Application Priority Data

Oct. 17, 2005 (BR) .................................. 0504385

(51) Int. Cl.
| | | |
|---|---|---|
| C01G 23/00 | (2006.01) | |
| C01G 23/04 | (2006.01) | |
| C01G 23/047 | (2006.01) | |
| C01G 25/00 | (2006.01) | |
| C01G 27/00 | (2006.01) | |
| C22B 34/10 | (2006.01) | |
| B03B 7/00 | (2006.01) | |
| C01G 34/10 | (2006.01) | |

(52) U.S. Cl. ............................. 423/80; 423/74; 423/82; 423/83; 423/84; 209/10; 209/11; 209/12.1

(58) Field of Classification Search ................... 423/80, 423/74, 82–84; 209/10–11, 12.1; C01G 23/00, C01G 23/04, 23/047, 25/00, 27/00, 34/10; C22B 34/10
See application file for complete search history.

(56) References Cited

U.S. PATENT DOCUMENTS 3,784,670 A * 1/1974 Yoshida et al. ................. 423/80

(Continued)

FOREIGN PATENT DOCUMENTS

| GB | 565349 A | 7/1944 |
|---|---|---|
| GB | 2305913 A | 4/1997 |

OTHER PUBLICATIONS

International Search Report dated Feb. 23, 2007, mailed Mar. 13, 2007 for PCT Application No. PCT/BR2006000190, 2 pages.

(Continued)

*Primary Examiner*—Scott Kastler
*Assistant Examiner*—Alexander Polyansky
(74) *Attorney, Agent, or Firm*—Arent Fox LLP; James Bindseil

(57) ABSTRACT

A process for the enrichment of anatase mechanical concentrates, in order to obtain synthetic rutile with low contents of rare earth and radioactive elements, comprising the steps of: calcination of the anatase concentrate; reduction of the calcined product; dry or wet low-intensity magnetic separation of the reduced product; dry, high-intensity, high-gradient magnetic separation of the non-magnetic fraction from the low-intensity separation; leaching of the high-intensity magnetic fraction; oxidation of the dried product; leaching of the quenched product; filtering of the product from the second leaching; drying of the filtered product; and dry, high-intensity, high-gradient magnetic separation of the product of the second leaching.

22 Claims, 3 Drawing Sheets

U.S. PATENT DOCUMENTS

Figure 1:
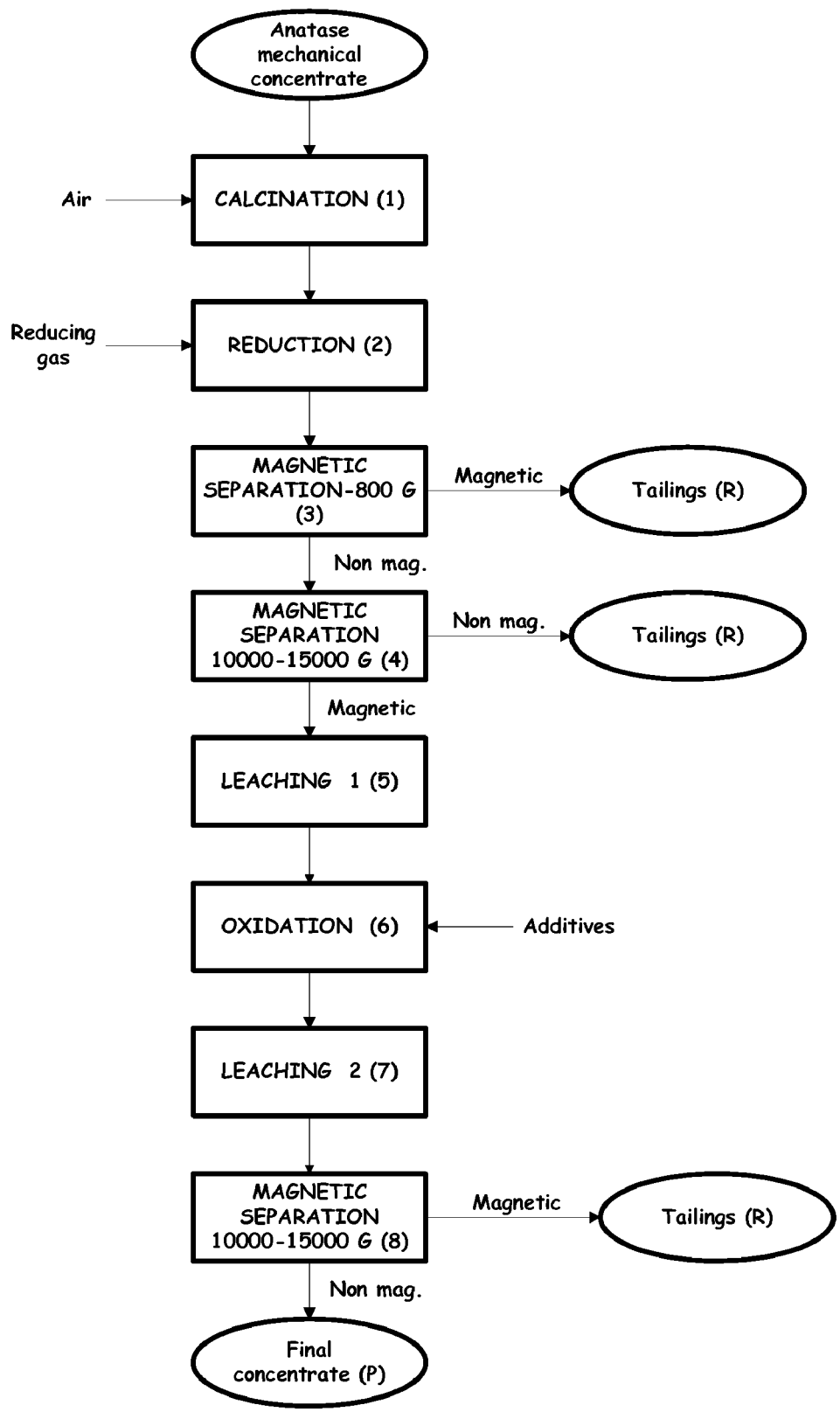

| | | | | |
|---|---|---|---|---|
| 4,176,159 | A | * | 11/1979 | Paixao et al. .................. 423/80 |
| 5,411,719 | A | * | 5/1995 | Hollitt et al. .................. 423/69 |
| 5,427,749 | A | * | 6/1995 | Hollitt et al. .................. 423/74 |
| 2004/0076578 | A1 | * | 4/2004 | Winter ...................... 423/610 |

OTHER PUBLICATIONS

Written Opinion of the International Searching Authority, mailed Mar. 13, 2007 for PCT Application No. PCT/BR2006000190, 2 pages.

* cited by examiner

PROCESS FOR ENRICHMENT OF ANATASE MECHANICAL CONCENTRATES IN ORDER TO OBTAIN SYNTHETIC RUTILE WITH LOW CONTENTS OF RARE EARTH AND RADIOACTIVE ELEMENTS

CLAIM OF PRIORITY

The present Application for Patent is a 35 USC § 371 national stage application claiming priority to PCT Application No. PCT/BR2006/000190, filed Sep. 20, 2006, and to Brazilian Patent Application No. PI 0504385-9, filed on Oct. 17, 2005, both assigned to the assignee hereof and both hereby expressly incorporated by reference herein.

DESCRIPTION OF THE INVENTION

The present invention relates to a process for providing titanium concentrates suitable to be used as raw material for the chloride process of titanium dioxide pigment manufacture from anatase concentrates obtained through mechanical concentration processes.

In Brazil there are extensive titanium ore reserves present in the so-called alkaline pipes in the states of Minas Gerais and Goias. However, in the Brazilian reserves the occurring mineral is anatase, rather than more common rutile and ilmenite found elsewhere. To date, several restrictions of technical order and specification of products have hampered the industrial exploitation of Brazilian anatase reserves. Amongst these, the high content of impurities contained in the final concentrate are outstanding, such content being above the specification of the chloride process of titanium dioxide pigment manufacture. The most notably frequent impurities are alkaline-earth elements, rare earths and uranium and thorium-containing minerals. It should be stressed that the production of $TiO_2$ pigments represents the biggest industrial application of titanium-containing raw materials nowadays.

For the purpose of overcoming such difficulties and in order to obtain an anatase based product of commercial value, several processes have been proposed. Such processes, however, present a number of drawbacks, either because they do not provide recovery of a product suitable to market specifications, or in view of high cost of the unit operations required therefor.

Hence, one of the objects of the present invention is to provide a process for upgrading anatase mechanical concentrates, thereby obtaining synthetic rutile with low contents of rare earths and radioactive elements. As a result, a product of high quality and with manufacturing costs lower than those associated with conventional processing routes is obtained.

Figure 2:
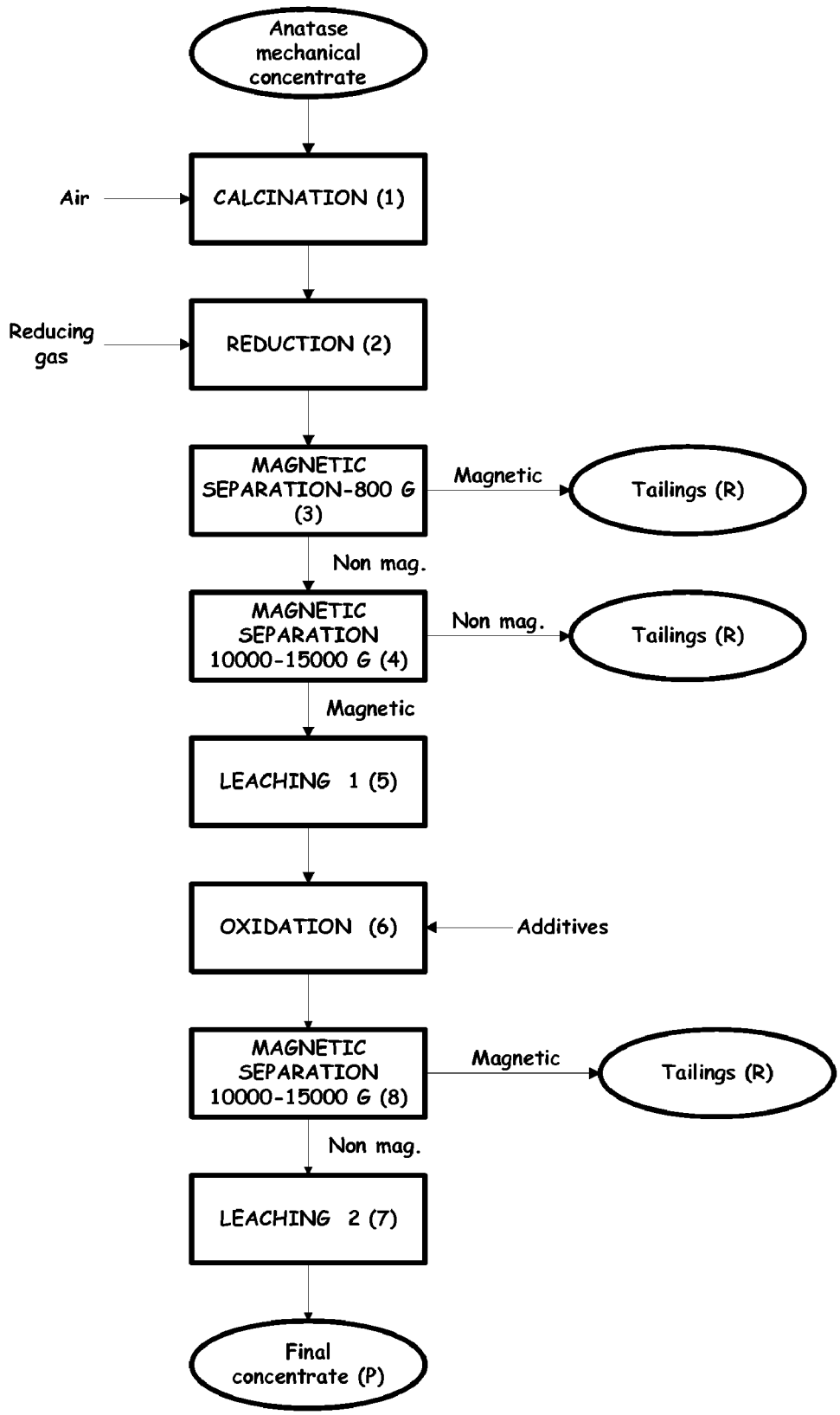
Figure 3:
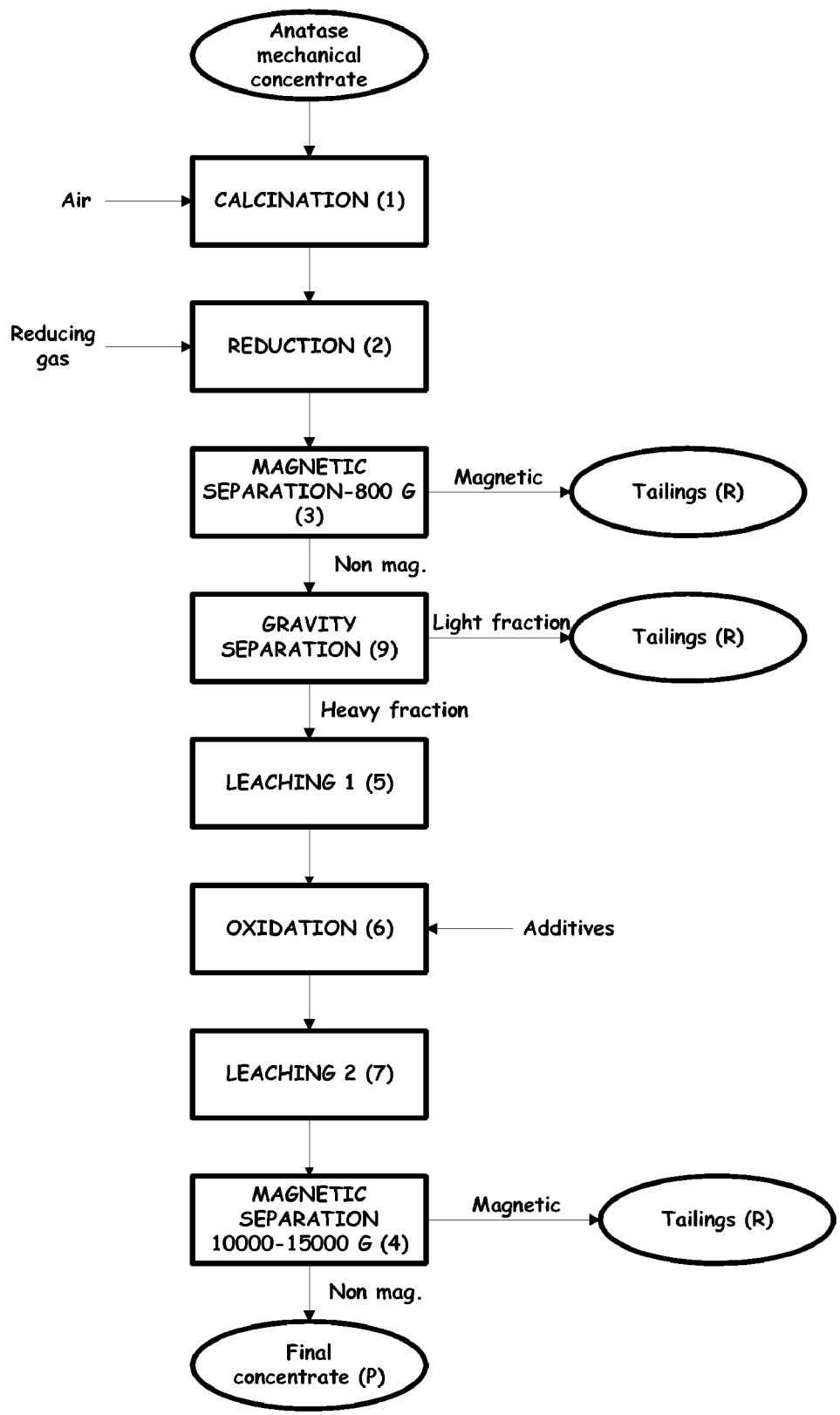

The present invention will be described below with reference to the attached drawings, in which:

FIG. 1 represents a flowsheet of the process for enrichment of mechanical concentrates of anatase in order to obtain synthetic rutile with low contents of rare earths and radioactive elements;

FIG. 2 represents a variant of the flowsheet illustrated in FIG. 1, of the process for the enrichment of mechanical concentrates of anatase in order to obtain synthetic rutile with low contents of rare earths and radioactive elements; and FIG. 3 represents another variant of the flowsheet illustrated in FIG. 1, of the process for the enrichment of anatase mechanical concentrates in order to obtain synthetic rutile with low contents of rare earths and radioactive elements.

The present invention is characterized by unique combinations of unit operations known in the state of the art of mineral processing, the result of which is the production of synthetic rutile with low contents of rare earths and radioactive elements from anatase mechanical concentrates.

For purposes of the present invention, anatase mechanical concentrate is defined as the material resulting from the use of the following sequence of unit operations in processing raw anatase ores: disaggregation, commination, screening, milling and classification in a particle size range between 0.074 and 1.000 mm, low (800 Gauss) and medium (2000 Gauss) intensity magnetic separations, wherein the mechanical concentrate of anatase is the non-magnetic fraction resulting from the separation at 2000 Gauss.

The process proposed herein begins with calcination of the anatase mechanical concentrate carried out at a temperature ranging between 400 and 600° C., for a period of time from 15 to 60 minutes, in the presence of air, followed by reduction with hydrogen, carbon monoxide, the gas resulting from the combustion of natural gas or any carbon based solid reductant—metallurgical coke, charcoal, petroleum coke, graphite, among others—in the same temperature range, for 5 to 15 minutes. The purpose of such combined calcination and reduction operations is to promote partial reduction of iron oxides and hydroxides contained in the ore, with consequent production of magnetite, in such a way that this phase can be easily removed by means of magnetic separation. In the process described in Brazilian patent PI-9501272-9, reference is made to a "magnetizing reduction", however, such operation is not preceded by a calcination step. In addition, residence time in the reducing step referred to in said patent is from 30 to 60 minutes. It has been shown that, by conducting a calcination operation prior to reduction, it is possible to lower the reduction time from 60 minutes to values between 5 and 15 minutes, with consequent positive effects on the rest of the upgrading process, for it implies an increase of efficiency in the subsequent leaching steps.

The reduced product feeds a low-intensity magnetic separation step (600 to 1000 Gauss) that can be carried out either as a dry or wet operation, wherein the magnetic fraction—which contains essentially synthetic magnetite—is discarded, and the non-magnetic fraction constitutes the material of interest. This fraction is then directed to a dry, high-intensity, high-gradient magnetic separation operation (10000 to 15000 Gauss), which provides two products: the non-magnetic fraction—rich in silicates, secondary phosphates and zirconium, uranium and thorium containing minerals—that is discarded, and the magnetic fraction—rich in titanium—that is separated for next processing steps. Alternatively, this high-intensity magnetic separation can be replaced by a gravity separation that can be carried out in a centrifugal jig. In this alternative, the light fraction resulting from the jigging step, containing high amounts of silicates, micas, secondary phosphates, in addition to zirconium, uranium and thorium-containing minerals, is discarded, while, the heavy fraction, rich in titanium, is transferred to the next processing steps.

The magnetic fraction resulting from the high-intensity separation, or the heavy fraction recovered from the gravity separation is fed to a first leaching, that can be carried out in agitated tanks or columns (fluidized bed leaching), with hydrochloric acid at a concentration of 20 to 25% HCl (w/w), a solid-liquid ratio of 1/2 w/w, a temperature ranging from 90° C. to 107° C., during a time period of 2 (two) to 4 (four) hours. During this leaching there occurs a substantial solubilization of impurities contained in the concentrate, specially iron, aluminium, manganese, phosphorus, alkaline earth elements—calcium, magnesium, barium and strontium-rare earth elements and thorium.

After washing, solid/liquid separation and drying, the leached residue is oxidized in a rotary kiln or fluidized bed furnace, for a period of time ranging from 30 to 120 minutes, at a temperature between 900° C. and 1200° C., in the presence of a mixture of additives which will be detailed below. During this operation, it is essential to maintain an atmosphere with a high degree of oxidation, what is attained by continuous injection of air or oxygen.

The additive mixture used in the oxidation step shall include the following substances: alkali metal sulphates (mainly lithium, sodium and potassium), alkali metal carbonates (again, mainly lithium, sodium and potassium), phosphoric acid ($H_3PO_4$) and, eventually, sodium chloride. The relative amounts of these substances will be detailed in the examples given in the end of the pre-sent proposal. The purpose of this mixture of additives is to combine with impurities contained in the ore, forming phases that will be removed from titanium rich minerals in the subsequent operations of leaching and high-intensity magnetic separation. During oxidation, anatase is irreversibly transformed into rutile, becoming the resulting titanium phase.

The oxidized product must be quenched, which is carried out by means of fast cooling, preferably in a water bath at room temperature.

The concentrate from oxidation is submitted to a second leaching step, again in agitated tanks or columns, wherein the leaching agent can be either hydrochloric acid (HCl) or sulphuric acid ($H_2SO_4$). The conditions of this second leaching—time, temperature, acid concentration and pulp density—will be specified in the examples cited in the end of the text. In the second leaching the remaining impurities, such as iron, aluminium, phosphorus, calcium, the remaining rare earth elements, uranium and thorium, are attacked and are transferred to the solution, with the consequent enrichment in titanium of the solid residue.

In the process detailed in patent application PI-0304443-2 (Brazil), of the present inventors, an oxidation/leaching sequence similar to the one detailed herein is described. However, due to the fact that additives used in the high temperature oxidation step comprise a mixture of silica/sodium fluoride ($SiO_2$/NaF), the leaching following the oxidation is only effective if it is carried out in the presence of HF or NaF, that is, leaching in the presence of fluoride ion ($F^-$). Moreover, by using a NaF/$SiO_2$ mixture in the oxidation, only hydrochloric acid is effective in the removal of impurities during the subsequent leaching. It was surprisingly found that the great advantage of using the mixture of additives cited hereinabove—alkali metals sulphate/carbonate+phosphoric acid and eventually sodium chloride—in the high temperature oxidation is that the fluoride ion needs not to be used in the subsequent leaching, in addition to the fact that either HCl or $H_2SO_4$ can effectively be used as leaching agent.

After washing, solid/liquid separation and drying, the residue from second leaching is submitted to a dry, high-intensity, high-gradient, magnetic separation (10000 to 15000 Gauss), the purpose of which is to separate in the magnetic fraction a material with a high content of iron, manganese, calcium and the balance of uranium and thorium, which is then discarded. The non-magnetic fraction—synthetic rutile which is rich in $TiO_2$ and has a low content of impurities harmful to the chloride process of titanium pigment manufacture—constitutes the product of interest.

The nature and scope of the present invention can be better understood based on the following examples. It should be pointed out that such examples are only illustrative and shall not be regarded as limiting the present process.

EXAMPLE 1

The sequence of unit operations related to this example is shown in FIG. 1. A sample of anatase mechanical concentrate with a mass of 1000 grams and the chemical composition given in Table 1 was submitted to the sequential steps of calcination in air at 500° C. for 15 minutes and reduction with hydrogen at 500° C. for 5 minutes, both carried out in a same laboratory scale, resistance heating furnace in which a vertical stainless steel kiln (fluidized bed) was contained. The product from reduction was cooled inside the fluidized bed reactor under an atmosphere of nitrogen, in order to prevent re-oxidation of magnetic phases formed during reduction. This product, with a mass of 945 g, was then submitted to low-intensity magnetic separation, carried out in a laboratory scale, drum and permanent magnet wet separator, with a field intensity of 800 Gauss. The magnetite rich magnetic fraction, with a mass of 269 g, was discarded and the non-magnetic fraction, after drying, with a mass of 676 g and having the chemical composition shown in Table 1, constitutes, the head sample of the following high-intensity magnetic separation step. This separation was carried out in a rare-earth roll and permanent magnet, dry, laboratory separator, with high-gradient and field intensity equal to 10000 Gauss. Two materials resulted from this operation: 32 g of a non-magnetic material, with high content of impurities, specially phosphorus, silicon and calcium, which was discarded, and 644 g of a magnetic material, the chemical composition of which is shown in Table 1. The magnetic fraction fed the following leaching step, which was carried out in a laboratoty scale apparatus comprising a heating mantle, inside which a glass reactor with reflow and mechanical agitation was placed, under the following conditions: temperature of 105° C., time of 4 (four) hours, the leaching agent being 25% (w/w) hydrochloric acid, with a 1/2 w/w solid-liquid ratio. After washing, filtration and drying steps, 417 g of a concentrate having the chemical composition shown in Table 1 were recovered. Then, a mixture containing 45 parts of sodium sulfate ($Na_2SO_4$), 43 parts of sodium carbonate ($Na_2CO_3$) and 12 parts of concentrated phosphoric acid ($H_3PO_4$) (85%) was mixed with the leached product in an amount equal to 15% of the mass of the concentrate. After homogenization, the resulting mixture fed the oxidation step which was carried out continuously in a laboratory scale, horizontal furnace, inside which a mullite tube connected to a device that provided continuous rotation around the tube axis was placed. Furnace temperature was set at 1000° C. and operating conditions of the furnace/tube equipment rotating speed and angle of inclination—were regulated in order to promote a residence time of the ore/additive charge of about 1 (one) hour in the heated zone of the furnace. A recipient containing water was positioned in the mullite tube outlet, with the purpose of promoting quenching of the oxidized product. The resulting material, after filtration and drying, was leached with a solution of 25% w/w HCl, at a solid/liquid ratio of 1/2 w/w, a temperature of 105° C., for 4 hours, in a bench scale, glass reactor with reflow and mechanical agitation. After washing, filtration and drying, 279 g of an intermediate concentrate having the chemical composition shown in Table 1 were recovered. Finally, the leached product was submitted to dry, high-intensity, magnetic separation, in a laboratory separator (rare-earth roll and permanent magnet, high-gradient and 15000 Gauss field intensity). Two materials resulted from this separation: the magnetic fraction, with a mass of 8 g, which was discarded and the non-magnetic fraction, with a mass of 271 g, the chemical composition of which is shown in Table 1, that constitutes the synthetic rutile of interest. It can be seen that this product possesses a high content of $TiO_2$ and very low contents of Fe, Al, Mn, alkaline-earth metals (Ca, Ba and Sr), rare-earth elements—illustrated by the contents of Ce and La—in addition to amounts of uranium and thorium (U+Th<100 ppm) fully compatible with its use as raw material for the chloride process of titanium dioxide manufacture. This requirement of low contents of U and Th is in accordance with the environmental legislation now in force in the whole world concerning the use of raw materials and disposal of effluents by the $TiO_2$ pigment industry.

TABLE 1

Example 1 - contents (mass %) of the main constituents of the ore in different steps of the upgrading process

| Material | (1) | (2) | (3) | (4) | (5) | (6) |
|---|---|---|---|---|---|---|
| Mass, g | 1000 | 676 | 644 | 417 | 279 | 271 |
| $TiO_2$ | 53.80 | 67.60 | 68.60 | 87.70 | 94.95 | 94.70 |
| Fe (total) | 16.40 | 10.60 | 11.80 | 3.89 | <1.40 | <1.40 |
| $Al_2O_3$ | 5.98 | 4.68 | 4.56 | 1.58 | <0.15 | <0.15 |
| CaO | 0.97 | 1.02 | 0.80 | 0.25 | 0.10 | 0.10 |
| BaO | 1.13 | 1.07 | 1.03 | <0.10 | <0.10 | <0.10 |
| SrO | 0.44 | 0.31 | 0.31 | <0.05 | <0.05 | <0.05 |
| $P_2O_5$ | 5.31 | 5.03 | 5.09 | 3.11 | 0.78 | 0.75 |
| $SiO_2$ | 2.15 | 1.21 | 1.07 | 0.72 | 0.62 | 0.56 |
| MnO | 0.81 | 0.68 | 0.71 | 0.23 | 0.05 | 0.05 |
| $CeO_2$ | 1.01 | 0.98 | 0.90 | 0.30 | <0.08 | <0.08 |
| $La_2O_3$ | 0.44 | 0.43 | 0.43 | 0.10 | 0.04 | 0.04 |
| U (ppm) | 124 | 130 | 132 | >150 | 58 | 45 |
| Th (ppm) | 359 | 415 | 417 | 213 | 81 | 53 |

(1) mechanical concentrate
(2) concentrate after low-intensity magnetic separation
(3) concentrate after high-intensity magnetic separation
(4) concentrate after first leaching with HCl
(5) concentrate after second leaching with HCl
(6) final synthetic rutile

EXAMPLE 2

The sequence of unit operations used in this example is the one shown in FIG. 1. A sample of 1000 grams of the same anatase mechanical concentrate described in Example 1 was submitted to sequential steps of calcination at 500° C. for 30 minutes and reduction with a CO—$H_2$—$CO_2$—$N_2$ containing gas mixture, for 15 minutes, both steps being carried out in the same laboratory scale, fluidized bed reactor. Next, it was submitted to the same sequence of unit operations described in Example 1 up to the oxidation step, that is: wet, low-intensity magnetic separation, dry, high-intensity, high gradient magnetic separation and leaching in 25% w/w hydrochloric acid at 105° C., at a solid-liquid ratio of 1/2 w/w, for 4 hours. The concentrate resulting from leaching, after washing, filtration and drying, with a mass of 411 g, presented the chemical composition shown in Table 2. This material was then mixed with same additives detailed in Example 1—$Na_2SO_4$/$Na_2CO_3$/$H_3PO_4$—and oxidized in a laboratory scale, horizontal rotary furnace, with a continuous flow of oxygen at 1000° C. for 60 minutes. The product from oxidation was quenched in water and then leached in 55.0% w/w $H_2SO_4$, at a solid-liquid ratio of 1/2 w/w, for 4 hours, at a temperature of 135° C., in a laboratory scale equipment similar to the one described in Example 1. After washing, solid/liquid separation and drying steps, 296 g of a material, the chemical composition of which is shown in Table 2, were obtained. The product of the second leaching was submitted to a final high-intensity and high-gradient magnetic separation operation in the same equipment as the one referred to in the previous example. As a result of this operation, two materials were obtained: the magnetic fraction, having a mass of 10 g, which was discarded, and the non-magnetic fraction, weighing 286 g. The latter, the chemical composition of which is illustrated in Table 2, constitutes the product of interest. It can be seen that the use of a CO—$H_2$ based reducing gas mixture—instead of pure hydrogen—and the use of sulphuric acid in the second leaching—instead of hydrochloric acid—resulted in recovery of a final product of equivalent quality to the one of the previous example.

TABLE 2

Example 2 - contents (mass %) of the main constituents of the ore in different steps of the concentration process

| Material | (1) | (2) | (3) | (4) | (5) | (6) |
|---|---|---|---|---|---|---|
| Mass, g | 1000 | 674 | 640 | 411 | 296 | 286 |
| $TiO_2$ | 53.80 | 68.00 | 68.90 | 87.35 | 92.05 | 92.80 |
| Fe (total) | 16.40 | 10.50 | 11.70 | 4.48 | 1.85 | 1.70 |
| $Al_2O_3$ | 5.98 | 1.29 | 1.45 | 1.48 | <0.15 | <0.15 |
| CaO | 0.97 | 1.07 | 0.72 | 0.24 | 0.07 | 0.06 |
| BaO | 1.13 | 1.02 | 1.03 | <0.10 | <0.10 | <0.10 |
| SrO | 0.44 | 0.28 | 0.29 | <0.05 | <0.05 | <0.05 |
| $P_2O_5$ | 5.31 | 4.31 | 4.18 | 3.02 | 0.55 | 0.48 |
| $SiO_2$ | 2.15 | 1.54 | 0.95 | 0.74 | <0.20 | <0.20 |
| MnO | 0.81 | 0.73 | 0.77 | 0.23 | 0.07 | 0.07 |
| $CeO_2$ | 1.01 | 1.01 | 0.94 | 0.23 | <0.08 | <0.08 |
| $La_2O_3$ | 0.44 | 0.41 | 0.42 | 0.11 | 0.06 | 0.06 |
| U (ppm) | 124 | 145 | 141 | >150 | 39 | 43 |
| Th (ppm) | 359 | 455 | 431 | 222 | 55 | 49 |

(1) mechanical concentrate
(2) concentrate after low-intensity magnetic separation
(3) concentrate after high-intensity magnetic separation
(4) concentrate after leaching with HCl
(5) concentrate after leaching with $H_2SO_4$
(6) final synthetic rutile

EXAMPLE 3

The sequence of unit operations of this example is illustrated in FIG. 2. A 1000 g sample of anatase mechanical concentrate, the composition of which is given in Table 3, was submitted to the same sequence of unit operations described in Example 1 up to the oxidation step, that is: calcination in the presence of air for 15 minutes, reduction with hydrogen for 5 minutes, both at 500° C. and in the same fluidized bed reactor, wet, low-intensity magnetic separation, dry, high-intensity and high-gradient magnetic separation and leaching in 25% w/w HCl at 105° C. for 4 hours, all these operations carried out in laboratory scale. After leaching, washing, solid/liquid separation and drying, 407 g of an intermediate material with chemical composition shown in Table 3 were recovered. The leached product was then mixed with the following additives, in a proportion equal to 15% of the mass of the leached concentrate: 42 w/w parts of sodium sulfate ($Na_2SO_4$), 40 w/w parts of sodium carbonate ($Na_2CO_3$), 12 w/w parts of phosphoric acid ($H_3PO_4$) and 6 w/w parts of sodium chloride (NaCl). The resulting mixture was submitted to oxidation, which was carried out continuously in the same equipment and under the same experimental conditions detailed in the previous examples—residence time of 60 minutes and temperature of 1000° C. The oxidized product was quenched in water and, after filtration and drying steps, was passed through the same laboratory scale, high-gradient and high-intensity magnetic separator referred to in the previous examples. The resulting magnetic fraction was discarded, while the non-magnetic fraction was transferred to a final leaching step with HCl. This leaching was carried out in a laboratory equipment similar laboratory to the one described in the previous examples, under the following conditions: concentration of HCl=25% w/w, solid-liquid ratio=1/2 w/w, temperature=105° C., time=4 hours. After washing, filtration and drying of the leaching residue, 304 g of a final product having the chemical composition shown in Table 3 were recovered. It can be seen that the alternative of carrying out the final magnetic separation prior to the second leaching, as well as the use of sodium chloride in the oxidation step have led to the production of a high purity synthetic rutile having a quality equivalent to those referred in the previous examples.

TABLE 3

Example 3 - content (mass %) of the main constituents of the ore in different steps of the concentration process

| Material | (1) | (2) | (3) | (4) | (5) |
|---|---|---|---|---|---|
| Mass, g | 1000 | 658 | 629 | 407 | 304 |
| $TiO_2$ | 52.40 | 65.31 | 66.63 | 85.55 | 94.13 |
| Fe (total) | 15.95 | 11.87 | 11.33 | 4.12 | <1.40 |
| $Al_2O_3$ | 5.52 | 2.69 | 2.50 | 1.57 | <0.15 |
| CaO | 1.20 | 1.08 | 0.82 | 0.22 | 0.08 |
| BaO | 1.16 | 1.03 | 1.03 | <0.10 | <0.10 |
| SrO | 0.46 | 0.29 | 0.28 | <0.05 | <0.05 |
| $P_2O_5$ | 5.61 | 4.33 | 4.16 | 3.12 | 0.65 |
| $SiO_2$ | 1.20 | 0.78 | 0.40 | 0.97 | 0.49 |
| MnO | 0.94 | 0.81 | 0.81 | 0.25 | 0.10 |
| $CeO_2$ | 1.07 | 0.92 | 0.91 | 0.27 | <0.08 |
| $La_2O_3$ | 0.45 | 0.40 | 0.41 | 0.14 | 0.03 |
| U (ppm) | 119 | >150 | >150 | >150 | 43 |
| Th (ppm) | 441 | 474 | 465 | 227 | 54 |

(1) mechanical concentrate
(2) concentrate after low-intensity magnetic separation
(3) concentrate after high-intensity magnetic separation
(4) concentrate after first leaching with HCl
(5) final synthetic rutile

EXAMPLE 4

The sequence of unit operations of this example is that of FIG. 3. A sample of 1000 grams of the same anatase mechanical concentrate referred to in Example 3 was submitted to the following sequence of unit operations: calcination with continuous flow of air for 15 minutes, reduction with $H_2$ for 10 minutes, both at 500° C. and in the same fluidized bed reactor, and wet, low-intensity magnetic separation, all these operations in laboratory scale. Next, the non-magnetic fraction of the low-intensity separation was fed to gravity separation carried out in a laboratory scale centrifugal jig. The heavy fraction recovered from the jig, with a mass of 642 g, was submitted to leaching with HCl, carried out in the same laboratory equipment and under the same conditions described in previous examples: concentration of HCl=25% w/w, solid-liquid ratio=1/2 w/w, temperature=105° C., time=4 hours. After washing, filtration and drying, the leaching residue was submitted to oxidation in the presence of the same additives ($Na_2SO_4$/$Na_2CO_3$/$H_3PO_4$ mixture), in the same relative proportions and amount mentioned in Examples 1 and 2. Such operation was carried out in the same laboratory scale equipment described in the previous examples. The oxidized product, after quenching in water, was leached in 25% w/w HCl, at a solid/liquid ratio of 1/2 w/w and temperature of 105° C., for 4 hours, in a laboratory scale equipment similar to the one mentioned in the previous examples. The residue of leaching, after washing, filtration and drying, was submitted to a final high-gradient, high-intensity magnetic separation in a similar equipment to the one described in previous examples. As a result of this operation, two products were obtained: the magnetic fraction, having a mass of 11 g, which was discarded, and the non-magnetic fraction, with a mass of 301 g, This non-magnetic fraction corresponds to the synthetic rutile of interest for the purposes of the process detailed herein. It can be seen that the use of gravity separation, instead of high-intensity magnetic for the removal of impurities rich in silicates, secondary phosphates and zirconium, uranium and thorium containing mineral, provides recovery of a synthetic rutile exhibiting the same quality of the products shown in the preceding examples, that is, a high concentration of $TiO_2$ and low content of contaminants deleterious to the chloride process of manufacture of titanium dioxide pigment.

TABLE 4

Example 4 - content (% mass) of the main constituent of the ore in different steps of the concentration process

| Material | (1) | (2) | (3) | (4) | (5) | (6) |
|---|---|---|---|---|---|---|
| Mass, g | 1000 | 667 | 642 | 420 | 312 | 301 |
| $TiO_2$ | 52.40 | 65.60 | 66.40 | 85.10 | 91.80 | 92.30 |
| Fe (total) | 15.95 | 10.90 | 11.60 | 3.52 | <1.40 | <1.40 |
| $Al_2O_3$ | 5.52 | 2.20 | 2.00 | 0.88 | <0.15 | <0.15 |
| CaO | 1.20 | 1.07 | 0.89 | 0.25 | 0.11 | 0.11 |
| BaO | 1.16 | 1.04 | 1.01 | <0.10 | <0.10 | <0.10 |
| SrO | 0.46 | 0.29 | 0.29 | <0.05 | <0.05 | <0.05 |
| $P_2O_5$ | 5.61 | 4.34 | 4.18 | 3.41 | 0.78 | 0.75 |
| $SiO_2$ | 1.20 | 0.84 | 0.35 | 0.83 | 0.96 | 0.95 |
| MnO | 0.94 | 0.77 | 0.85 | 0.20 | 0.06 | 0.06 |
| $CeO_2$ | 1.07 | 0.94 | 0.87 | 0.32 | <0.08 | <0.08 |
| $La_2O_3$ | 0.45 | 0.40 | 0.42 | 0.10 | 0.04 | 0.04 |
| U (ppm) | 119 | 108 | 106 | >150 | 58 | 52 |
| Th (ppm) | 441 | 479 | 468 | 199 | 63 | 49 |

(1) mechanical concentrate
(2) concentrate after low-intensity magnetic separation
(3) concentrate after gravity separation
(4) concentrate after first leaching with HCl
(5) concentrate after second leaching with HCl
(6) final synthetic rutile

The invention claimed is:
1. A process for enrichment of anatase mechanical concentrates in order to obtain synthetic rutile with low contents of rare earth and radioactive elements, comprising the following sequence of unit operations:
   calcination of the anatase concentrate in a fluidized bed or rotary kiln, at a temperature between 400° C. and 600° C., during a period of time from 15 to 60 minutes, wherein hydrated iron oxides are converted into hematite after hydration water is removed, providing a reduction in the time required for the next step;
   reduction of the calcined product, in a fluidized bed or rotary kiln, at a temperature between 400° C. and 600° C., during a period of time from 5 to 30 minutes, using as reducing agent hydrogen, natural gas or any carbon based reductant, the result of which is the transformation of hematite into magnetite;
   dry or wet low-intensity magnetic separation of the reduced product, in magnetic separators provided with permanent magnet and drum, the field intensity ranging from 600 to 800 Gauss, in which the magnetic fraction generated in the reduction step is discarded;
   dry, high-intensity, high-gradient magnetic separation of the non-magnetic fraction from the low-intensity separation, in drum or roll separators with rare-earth permanent magnet, magnetic field ranging from 10000 to 15000 Gauss, extracting silicates, secondary phosphates, monazite, calzirtite, zircolinite and uranium and thorium containing minerals;
   leaching of the high-intensity magnetic fraction in agitated tanks or fluidized bed columns, with a solution of 20-25% w/w HCl, at a solid-liquid ratio of 1:2 w/w, at a temperature between 90° C. and 107° C., and for a leaching residence time from 2 (two) to 4 (four) hours, promoting solubilization of impurities rich in iron, aluminium, phosphates, magnesium, barium, calcium, strontium, rare earths, uranium and thorium; filtering of the leached product in a belt filter; drying the filtered product in a rotary or fluidized bed drier;

oxidation of the dried product in a rotary kiln or fluidized bed reactor, at a temperature range from 900° C. and 1200° C., in the presence of a mixture of the following substances: alkali metal sulphates, alkali metal carbonates, phosphoric acid ($H_3PO_4$) and, optionally, sodium chloride; quenching of the oxidized product in water or compressed air, in a drum cooler or water immersion;

leaching of the quenched product in agitated tanks or columns, in such a way that said leaching can be carried out using either 25.0% w/w hydrochloric acid (HCl), at a solid-liquid ratio of 1:2 w/w, at a temperature range from 90° C. and 107° C., for 2 (two) to 4 (four) hours, or 55.0% w/w sulphuric acid ($H_2SO_4$), at a solid-liquid ratio of 1:2 w/w, for 2 (two) to 4 (four) hours, at a temperature of 135° C.;

filtering of the product from the second leaching in a belt filter;

drying of the filtered product in a rotary or fluidized bed drier; and dry, high-intensity, high-gradient magnetic separation of the product of the second leaching in drum or roll separators with rare-earth permanent magnet (10000 to 15000 Gauss), discarding the magnetic fraction and recovering the non-magnetic fraction as the end product (P), that is, the synthetic rutile of interest.

2. The process according to claim 1, wherein the final dry, high-intensity, high-gradient magnetic separation is carried out after the oxidation step, discarding the magnetic fraction and recovering the non-magnetic fraction, which is directed to a second leaching.

3. The process according to claim 1, wherein the separation of impurities rich in iron, silicates, secondary phosphates, monazite, calzirtite, zirconolite and uranium and thorium containing minerals after the reduction step is carried out by means of the sequential use of low-intensity magnetic separation and gravity separation operations.

4. The process according to claim 1, wherein the calcination step is carried out in an atmosphere rich in air or oxygen, at a temperature range from 400 to 600° C., during 15 to 60 minutes.

5. The process according to claim 1, wherein the high temperature oxidation step of the product from the first leaching is carried out in an atmosphere rich in air or oxygen, in the presence of a mixture with 35 to 45 parts by weight of alkali metal sulphates, 35 to 45 parts by weight of alkali metal carbonates and 10 to 30 parts by weight of phosphoric acid ($H_3PO_4$).

6. The process according to claim 1, wherein the additive mixture in the oxidation step includes up to 10 parts by weight of sodium chloride (NaCl).

7. A process according to claim 1, wherein the mixture of additives used is present in an amount equivalent to 5 to 20% of the mass of concentrate fed into this step.

8. The process according to claim 1, wherein the oxidation step is carried out in a temperature comprised between 900° C. and 1200° C.

9. The process according to claim 1, wherein the high temperature oxidation step of the ore/additive charge is carried out at a residence time from 15 to 120 minutes.

10. The process according to claim 1, wherein the leaching step after the high temperature oxidation is carried out using hydrochloric acid in a concentration range of 20 to 30% w/w HCl, for a time from 2 (two) to 6 (six) hours, at a temperature range from 90° C. to 107° C.

11. The process according to claim 1, wherein the leaching step after the high temperature oxidation is carried out using sulphuric acid, in a concentration range of 30 to 60% $H_2SO_4$, for a time from 2 (two) to 6 (six) hours, at a temperature range from 110° C. to 140° C.

12. The process according to claim 1, wherein in the oxidation step, the alkali metal sulphates are selected from the group consisting of: lithium sulphates, sodium sulphates, and potassium sulphates.

13. The process according to claim 1, wherein in the oxidation step, the alkali metal carbonates are selected from the group consisting of: lithium carbonates, sodium carbonates, and potassium carbonates.

14. The process according to claim 5, wherein the alkali metal sulphates are selected from the group consisting of: lithium sulphates, sodium sulphates, and potassium sulphates.

15. The process according to claim 6, wherein the alkali metal carbonates are selected from the group consisting of: lithium carbonates, sodium carbonates, and potassium carbonates.

16. The process according to claim 1, wherein in the reduction step, the carbon based reducant is selected from the group consisting of: metallurgical coke, charcoal, petroleum coke, and graphite.

17. The process according to claim 4, wherein the calcination step is carried out at a temperature of 500° C., for 15 minutes.

18. The process according to claim 7, wherein the mixture of additives used is present in an amount equivalent to 10 to 15% of the mass of concentrate.

19. The process according to claim 8, wherein the oxidation step is carried out in a temperature comprised between 1000° C. and 1100° C.

20. The process according to claim 9, wherein the high temperature oxidation step of the ore/additive charge is carried out at a residence time from 30 to 60 minutes.

21. The process of claim 10, wherein the leaching step after the high temperature oxidation is carried out using hydrochloric acid in a concentration range of 25% w/w HCl, for a time of 4 (four) hours, at a temperature of 105° C.

22. The process of claim 11, wherein the leaching step after the high temperature oxidation is carried out using sulphuric acid, in a concentration of 55% $H_2SO_4$, for 4 (four) hours, at a temperature of 135° C.

* * * * *